United States Patent [19]

Nakahara et al.

[11] Patent Number: 5,172,244

[45] Date of Patent: Dec. 15, 1992

[54] DIGITAL COPIER

[75] Inventors: Kazuyuki Nakahara, Tokyo; Tetsuo Sakurai, Sagamihara, both of Japan

[73] Assignee: Ricoh Company, Ltd., Tokyo, Japan

[21] Appl. No.: 728,298

[22] Filed: Jul. 11, 1991

Related U.S. Application Data

[62] Division of Ser. No. 391,921, Aug. 10, 1989, Pat. No. 5,051,839.

[30] Foreign Application Priority Data

| Sep. 12, 1988 | [JP] | Japan | 63-226362 |
| Sep. 16, 1988 | [JP] | Japan | 63-230121 |
| May 11, 1989 | [JP] | Japan | 1-116168 |

[51] Int. Cl.⁵ .............................................. H04N 1/00
[52] U.S. Cl. .................................. 358/401; 358/404; 358/407; 358/444
[58] Field of Search ............... 358/401, 406, 407, 408, 358/468, 442, 498; 355/308, 313, 314, 323

[56] References Cited

U.S. PATENT DOCUMENTS

| 4,001,500 | 1/1977 | Lavery et al. | 358/465 |
| 4,527,885 | 7/1985 | Ayata et al. | 358/468 |
| 4,539,600 | 9/1985 | Takahashi et al. | 358/464 |
| 4,578,715 | 3/1986 | Yamaguchi | 358/456 |
| 4,835,618 | 5/1989 | Shimizu . | |
| 4,868,685 | 9/1989 | Ueno | 358/471 |
| 4,947,266 | 8/1990 | Watanabe et al. | 358/408 |
| 4,980,780 | 12/1990 | Tanaka | 358/401 |
| 5,051,839 | 9/1991 | Nakahara et al. | 358/401 |

Primary Examiner—Edward L. Coles, Sr.
Assistant Examiner—Kim Yen Vu
Attorney, Agent, or Firm—Oblon, Spivak, McClelland, Maier & Neustadt

[57] ABSTRACT

A digital copier having a single scanner and a plurality of plotters which are physically independent of each other. The plotters may be designated one at a time. When the designated plotter is already operating, another plotter which is idle is desingated. When all the plotters are in operation at the time of designation, image data representative of a document read by the scanner are stored and, as soon as a designated plotter becomes idle, the plotter begins to plot the stored image data automatically. Further, when an error occurs in any of the plotters being operated, the copying operations are handed over to another plotter.

6 Claims, 9 Drawing Sheets

1

DIGITAL COPIER

This is a division, of application Ser. No. 07/391,921, filed on Aug. 10, 1989 now U.S. Pat. No. 5,051,839.

BACKGROUND OF THE INVENTION

The present invention relates to a digital copier having an image reader (scanner) and an image writer (plotter) which are physically independent of each other, and, more particularly, to a digital copier having a single image reader and a plurality of image writers which are cooperatively associated with each other.

A digital copier having a single image reader and two or more image writers which are implemented as a scanner and plotters, respectively, has been proposed. With this type of digital copier, one may designate any of the image writers to cause it to perform writing operations, i.e. copying operations. Assume a jam or similar error has occurred in an image writer having been designated and performing writing or copying operations. Then, it has been customary to interrupt the writing or copying operations and, after the removal of the error such as the removal of a jamming sheet, to resume the copying operations by using the same image writer.

In the prior art digital copier operable with a particular image writer as designated by the operator, when the designated image writer is already performing copying operations, a command on a start key or similar copy input key is not accepted and a document cannot be inserted in an automatic document feeder (ADF). Since no further copying operations can be reserved at the image writer in operation, one cannot press the copy input key or insert a document in an ADF without awaiting the end of copying operations of the image writer of interest. Another drawback with the prior art copier of the type described is that interrupting the operations to remove a jamming paper, for example, and then resuming the operation by using the same writing unit adds to the copying time due to the need for an extra error settling time. Especially, the error settling time is critical when it comes to errors of the kind which cannot be removed without a service manual.

SUMMARY OF THE INVENTION

It is therefore an object of the present invention to provide a digital copier which, even if a designated image writer is already operating, allows writing operations to be continued automatically without any key being operated again.

It is another object of the present invention to provide a digital copier which saves error settling time.

It is a further object of the present invention to provide a generally improved digital copier.

A digital copier of the present invention comprises an image reader for outputting image data representative of a document by reading the document, a store for storing the image data fed from the image reader, a plurality of image writers each for executing a sequence of copying steps to write an image on a recording medium on the basis of the image data stored in the store, each of the plurality of image writers outputting status data representative of a status thereof, a controller for controlling the plurality of image writers such that the plurality of image writers are selectively used, and a commanding unit for delivering commands to the controller.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 1:
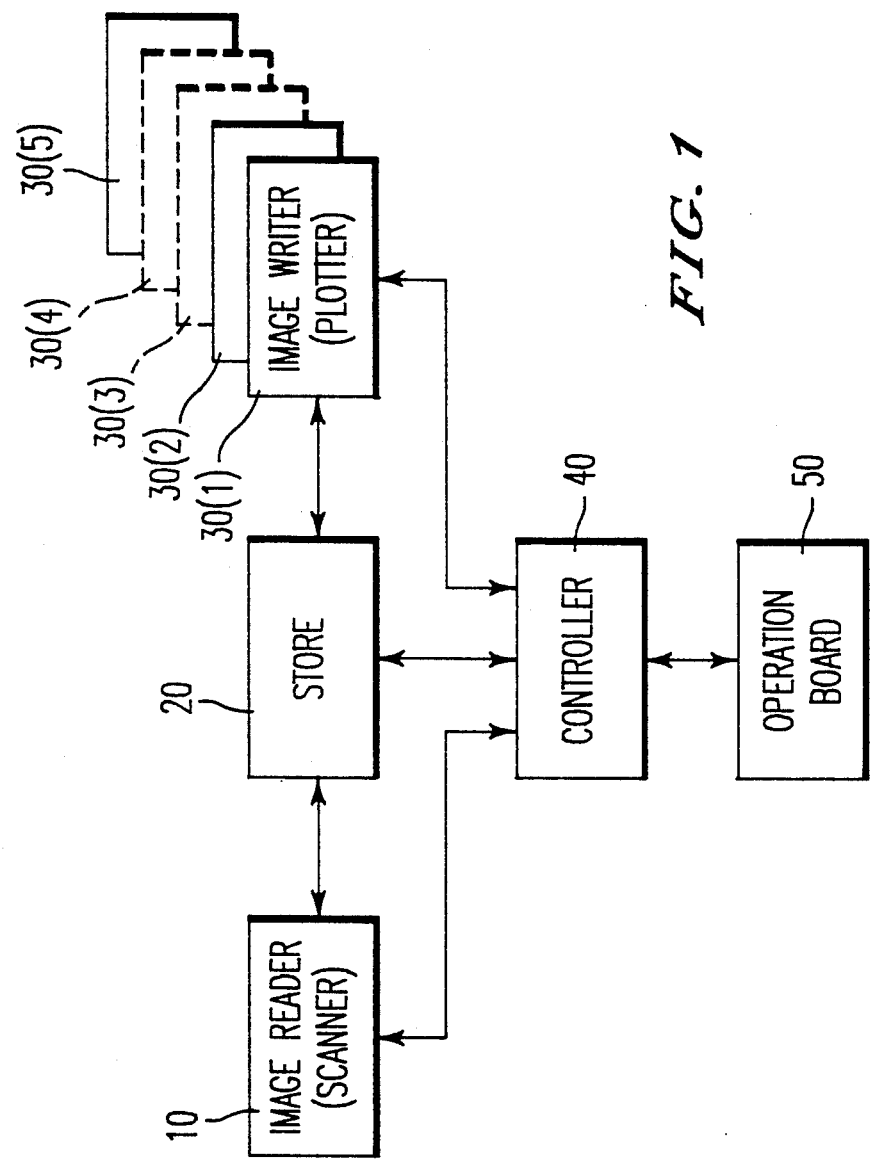
FIG. 1 is a schematic block diagram of a control system which is installed in a digital copier embodying the present invention.

Referring to FIG. 1 of the drawings, a digital copier embodying the present invention is shown and includes a single image reader 10 in the form of a scanner. A store 20 stores data which the image reader 10 reads out of an original document. A plurality of image writers, five image writers 30(1) to 30(5) in the illustrative embodiment, are implemented as plotters, and each executes a sequence of steps for writing the document data loaded in the store 20 on a paper sheet. A controller 40 controls the image reader 10, store 20, and image writers 30(1) to 30(5) as well as other various units, not shown. An operation board 50 includes a display for displaying various kinds of data, and a key matrix accessible for entering commands and data as needed.

Figure 2:
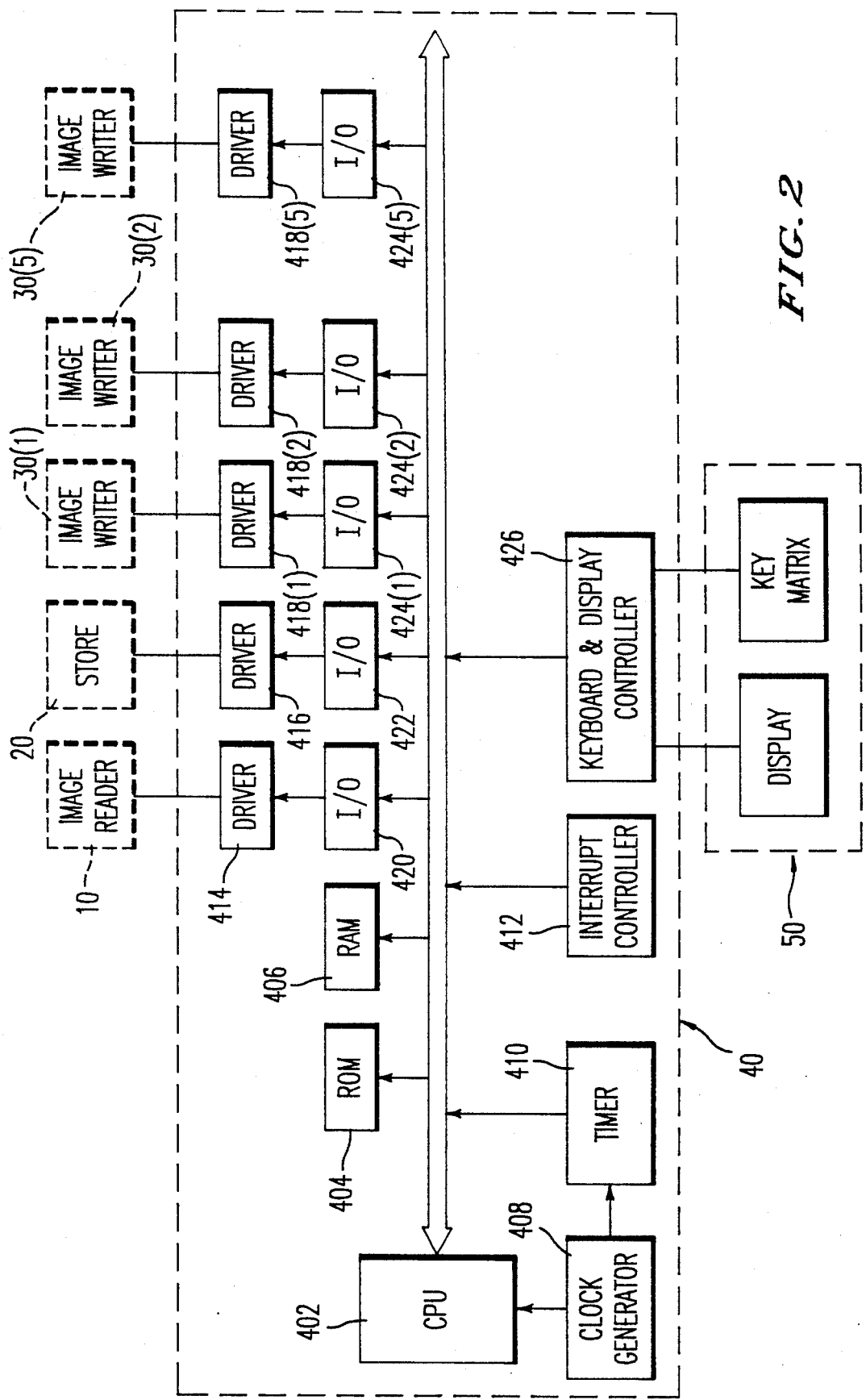
FIG. 2 is a schematic block diagram showing a specific construction of a controller included in the system of FIG. 1.

FIG. 2 indicates a specific construction of the controller 40. As shown, the controller 40 has a CPU (Central Processing Unit) 402, a ROM (Read Only Memory) 404, a RAM (Random Access Memory) 406, a clock generator 408, a timer 410, and an interrupt controller 412 adapted for interrupt processing. Drivers 414, 416 and 418(1) to 418(5) and I/O (Input/Output) interfaces 420, 422 and 424(1) to 424(5) allow the controller 40 to interchange data with the image reader 10, store 20, image writers 30(1) to 30(5), etc. A keyboard and display controller 426 interfaces the controller 40 to the operation board 50.

Figure 3:
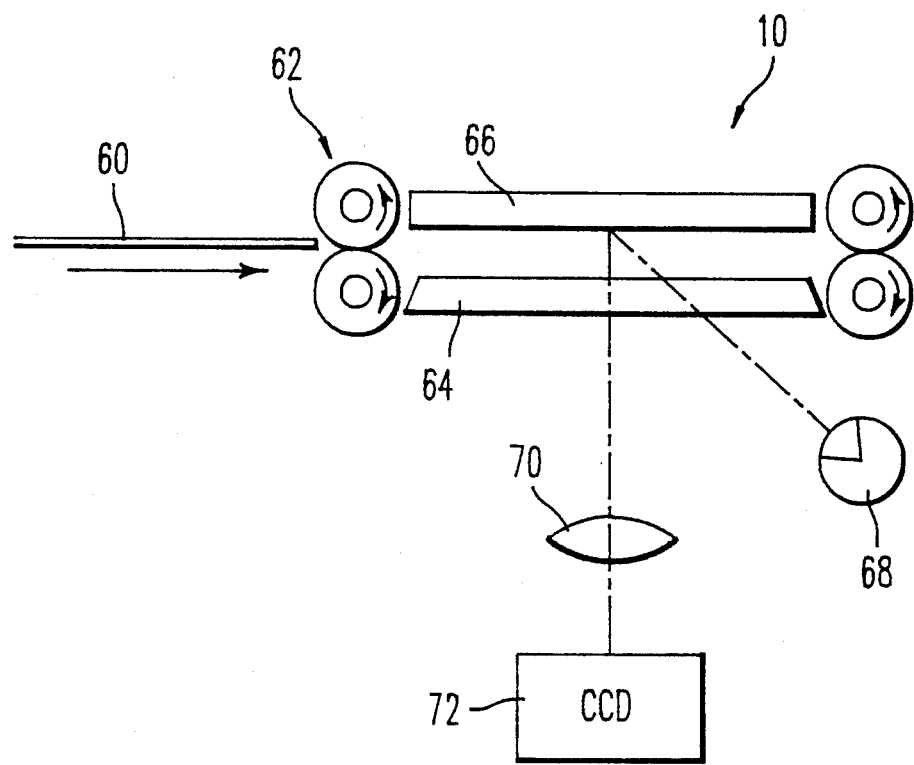
FIGS. 3 and 4 show a specific construction of an image reader of FIGS. 1 and 2 in a schematic elevation and a schematic block diagram, respectively.
Figure 4:
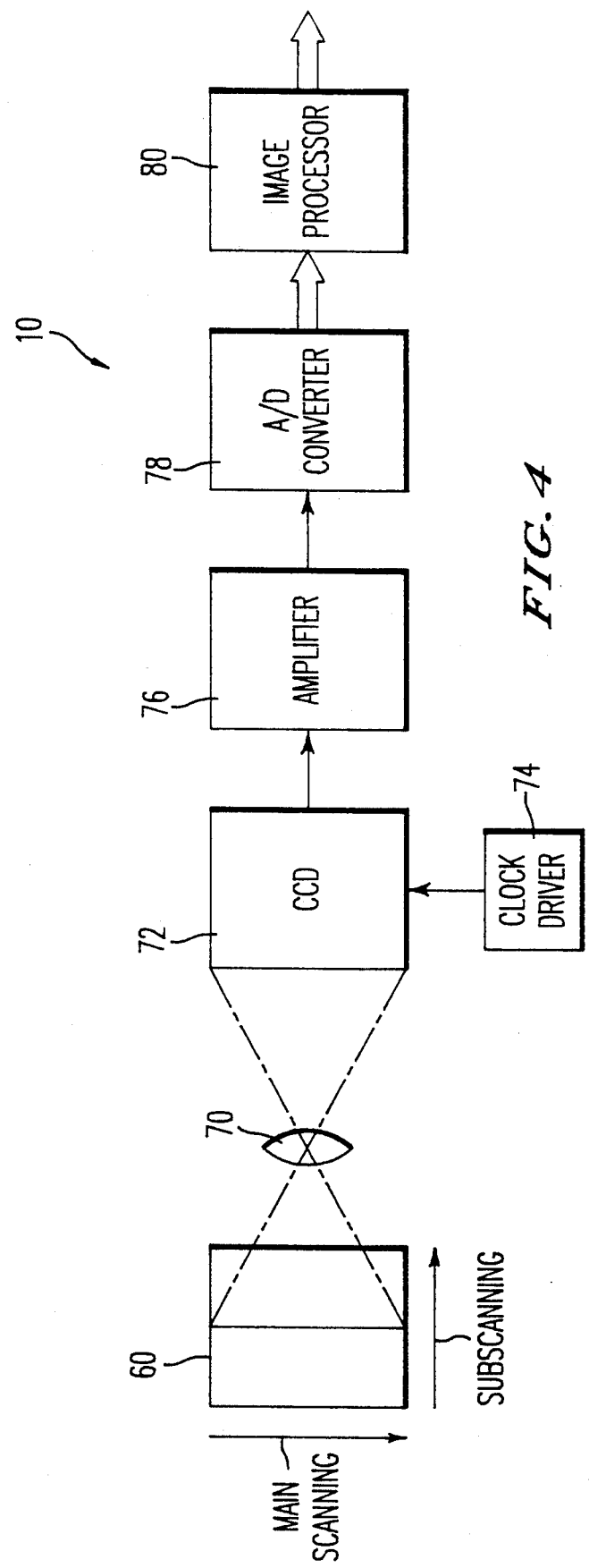

A specific construction of the image reader 10 is shown in FIGS. 3 and 4. In these figures, as the operator inserts a document 60 in a roller pair 62, the roller pair 62 being rotated drives the document 60 in a subscanning direction through between a glass platen 64 and a reflector 66. While the document 60 is so driven, a fluorescent lamp 68 emits light for scanning it in a main scanning direction. A reflection from the document is focused onto an imaging device in the form of a CCD (Charge Coupled Device) array 72 via a lens 70, whereby the document 60 is read. Driven by a clock driver 74, the CCD array 72 outputs variations in the density of the document 60 in the form of variations in voltage. The output of the CCD array 72 is amplified by an amplifier 76, then digitized by an AD (Analog-to- Digital) converter 78, and then applied to an image processor 80. The image processor 80 processes the input signal to produce image data. The image data are fed to the store 20 (see FIGS. 1 and 2) to be stored in the RAM 406.

Figure 5:
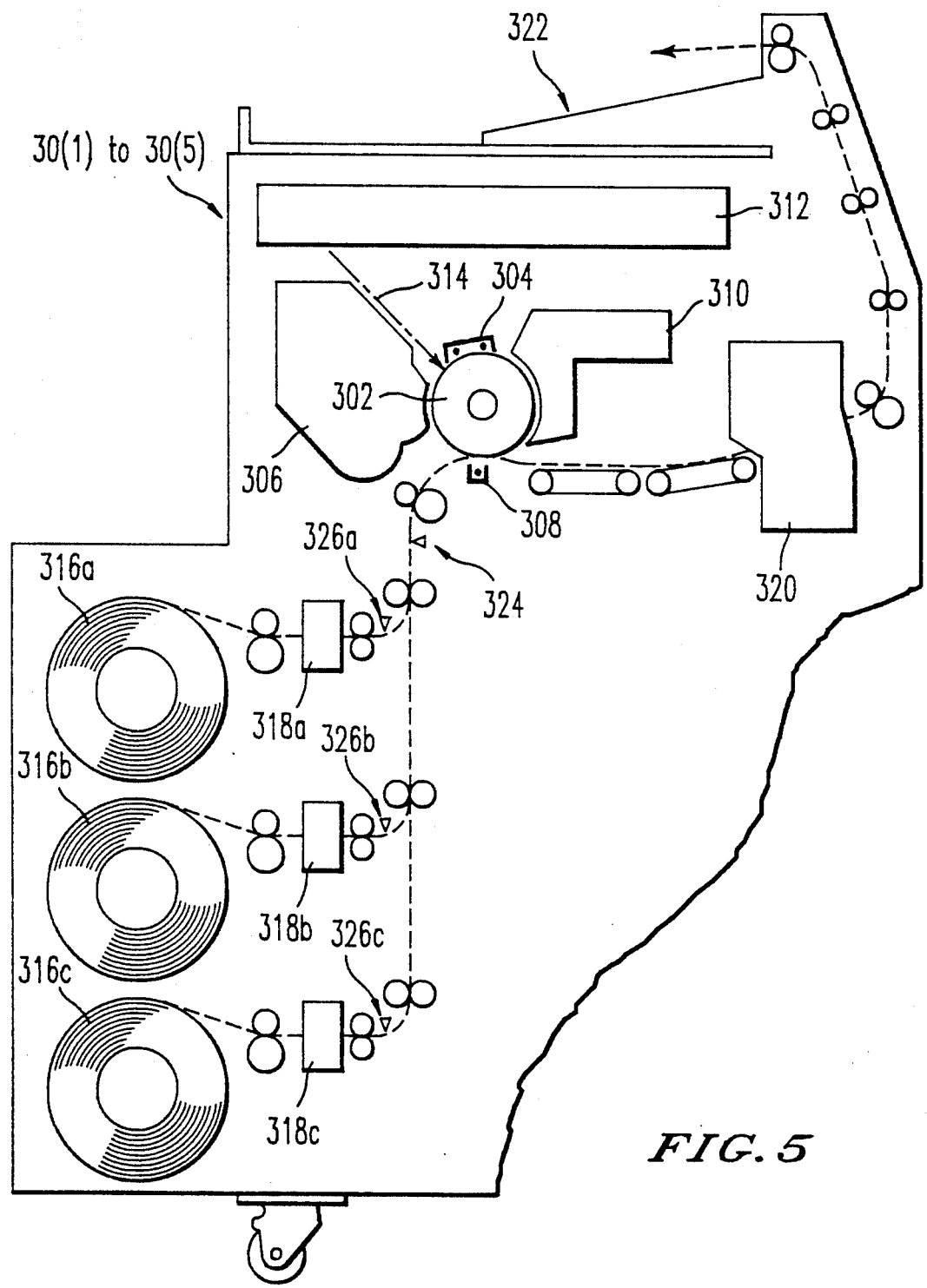
FIG. 5 is a sectional side elevation of an image writer shown in FIGS. 1 and 2.

The image writers 30(1) to 30(5) are constructed and arranged in the same manner, and a specific construction thereof is shown in FIG. 5. As shown, the image writer 30 has a photoconductive element 302 in the form of a drum. A charger 304, a developing unit 306, an image transferring unit 308 and a cleaning unit 310 are sequentially arranged around the drum 302 in the intended direction of rotation of the drum 302. That part of the drum 302 which intervenes between the charger 304 and the developing unit 306 defines an exposing station. Specifically, optics 312 emits a laser beam, or scanning beam, which contains image data. The scanning beam 314 illuminates the drum 302 at the exposing station, so that a latent image is electrostatically formed on the drum 302. The developing unit 306 develops the latent image with a toner, while the transferring unit 308 transfers the resulting toner image to a paper sheet. The image writer 30 is loaded with three different kinds of paper rolls 316a, 316b and 316c. A paper paid out from any of the rolls 316a to 316c is cut into a sheet of suitable size by one of cutters 318a, 318b and 318c which are individually associated with the rolls. The cut length of paper or paper sheet is transported to the drum 302 in synchronism with the toner image which is formed on the drum 302. After the image has been transferred from the drum 302 to the paper sheet, the paper sheet is driven out of the image writer 30 to a tray 322 via a fixing unit 320. Toner particles remaining on the drum 302 after such image transfer are removed by a cleaning unit 310 to prepare for the next image forming operation.

Referring to FIGS. 3 and 4, when the image reader 10 senses a document 60, one of the image writers 30(1) to 30(5) which is designated selects any of the paper rolls 316a to 316c (see FIG. 5) and starts paying it out. As the leading edge of the paper reaches a register sensor 324 included in the image writer, e.g., the image writer 30(1), the image writer 30(1) sends a data request signal to the store 20 at a particular timing which is associated with the position of the drum 302 to be illuminated by the scanning beam 314. In response, the store 20 delivers image data to the image writer 30(1). The image writer 30(1) modulates a laser beam issuing from the optics 312 by the image data to thereby produce the scanning beam 314. The data request signal is terminated when the paper sheet moves away from the register sensor 324. In FIG. 5, sensors 326a, 326b and 326c are provided for sensing the leading edges of papers which are paid out from the rolls 316a, 316b and 316c, respectively.

Figure 6:
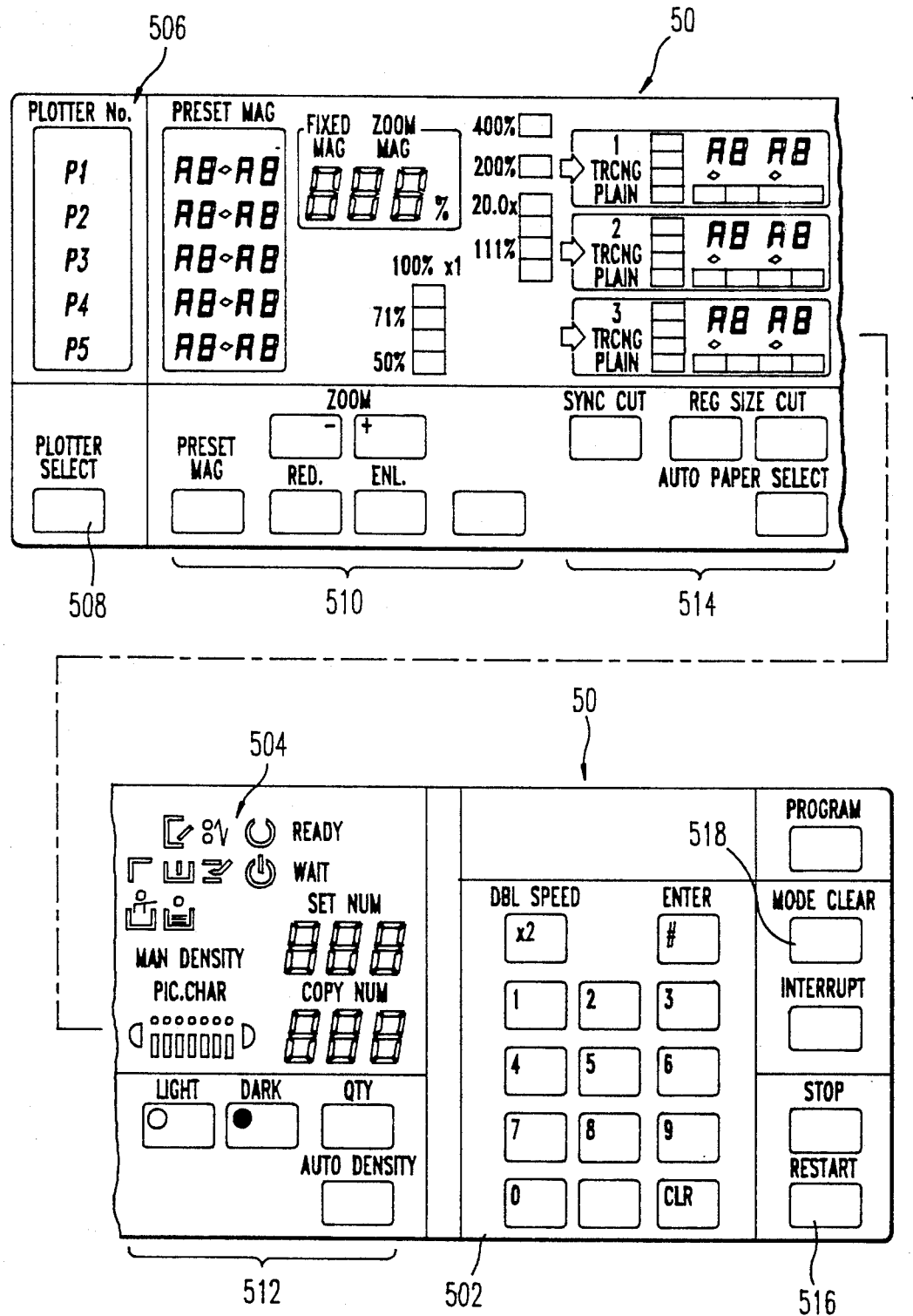
FIG. 6 is a plan view of an operation board also shown in FIGS. 1 and 2.

FIG. 6 shows a specific arrangement of the operation board 50. The operation board 50 has numeral keys 502 for entering numerical data such as a desired number of copies. A display section 504 displays a desired number of copies entered on the numeral keys 502 (hereinafter referred to as a set number), a number of copies produced (hereinafter referred to as a copy number), troubles such as a paper jam, the kind of paper selected, a set temperature, a magnification change ratio, etc. A plotter display section 506 displays various statuses of plotters P1 to P5 such as a busy or copying status and a ready or waiting status. It is to be noted that the plotters P1 to P5 are representative of the image writers 30(1) to 30(5), respectively. The operation board 50 also has a plotter select key 508, a magnification key group 510, an image density key group 512, a paper key group 514, a restart key 516, and a mode clear key 518.

Each of the image writers 30(1) to 30(5), i.e., plotters P1 to P5 sends a signal representative of a ready status or a busy status thereof to the operation board 50 via the controller 40. In response, the plotter display section 506 of the operation board 50 indicates whether or not the individual image writers 30(1) to 30(5) are waiting or copying, together with plotter numbers. A green LED (Light Emitting Diode) and a red LED may be associated with each of the image writers 30(1) to 30(5) to show that the associated image writer is waiting and that it is copying, respectively. When a copying operation is inhibited due to a jam or similar trouble or the exhaustion of papers, a signal representative of such a condition is fed to the operation board 50 to be displayed on the display section 504. In this case, the plotter select display 506 will glow in red. The plotter select key 508 is accessible for selecting a desired one of the image writers 30(1) to 30(5). A plotter number indicator P1, for example, will flash when the image writer 30(1) is selected. When any of the image writers 30(1) to 30(5) which is copying, e.g., the image writer 30(1) is selected, the red LED associated therewith will glow to show the operator that the slected image writer is in operation. The display section 504 indicates the current status of the image writer which is selected through the plotter select key 508, e.g. the image writer 30(1). If the image writer 30(1) is copying, the display section 504 indicates copying conditions (modes) being executed by the image writer 30(1). On the other hand, when any of the image writers which is waiting is selected, the display section 504 is brought into a mode input status so as to display various modes which may be entered on the numeral keys 502, magnification key group 510, and image density key group 512. Even when the image writer 30(1) being operated is selected, the mode clear key 518 may be pressed to enter other modes with no regard to the modes being executed; such modes will also appear on the display section 504.

Figure 7:
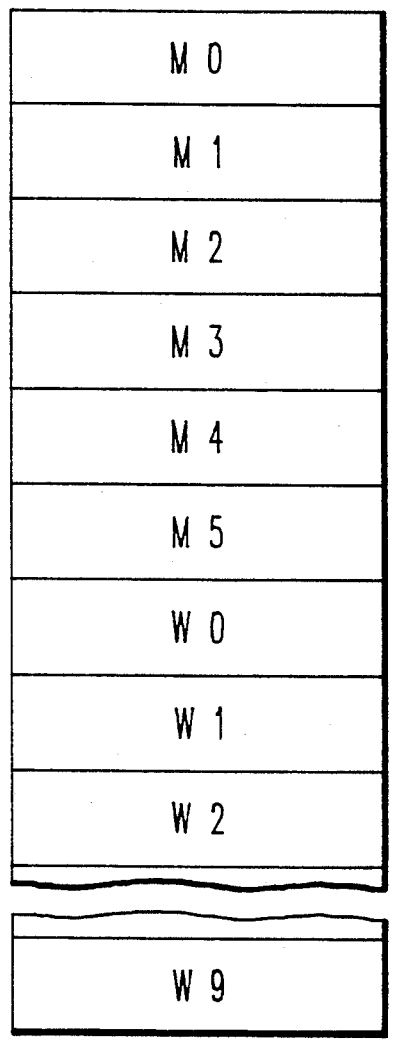
FIG. 7 shows a RAM table incorporated in a store of FIG. 1.

FIG. 7 shows a table which is stored in the RAM 406 of FIG. 2 for storing mode data. As shown, the table has mode areas M1 to M5 which are respectively loaded with copy modes being executed by the image writers 30(1) to 30(5) that are designated by the plotter numbers P1 to P5. An area M0 stores mode data representative of modes being inputted. Areas W1 to W9 are loaded with mode data associated with a waiting status. Labeled W0 is a working area. Assume that the image writer 30(1) with the plotter number P1 is selected through the plotter select key 508, and that the selected image writer 30(1) is already operating. Then, the display section 504 displays data on the basis of the data which are stored in the mode area M1 associated with the plotter number P1. When the mode clear key 518 is pressed while the waiting image writer 30(1) is selected or while the modes of the operating image writer 30(1) are displayed, the display section 504 displays data based on the data which are stored in the area M0. It is to be noted that pressing the mode clear key 518 restores the data stored in the area M0 to initial modes, i.e., those modes which will be set up automatically on the turn-on of a power switch. In the illustrative embodiment, the initial modes are a synchronous cut mode, an upper paper feed stage select mode, a 100% magnification change ratio mode, an automatic density mode, and a set number 1 mode.

Figure 8A:
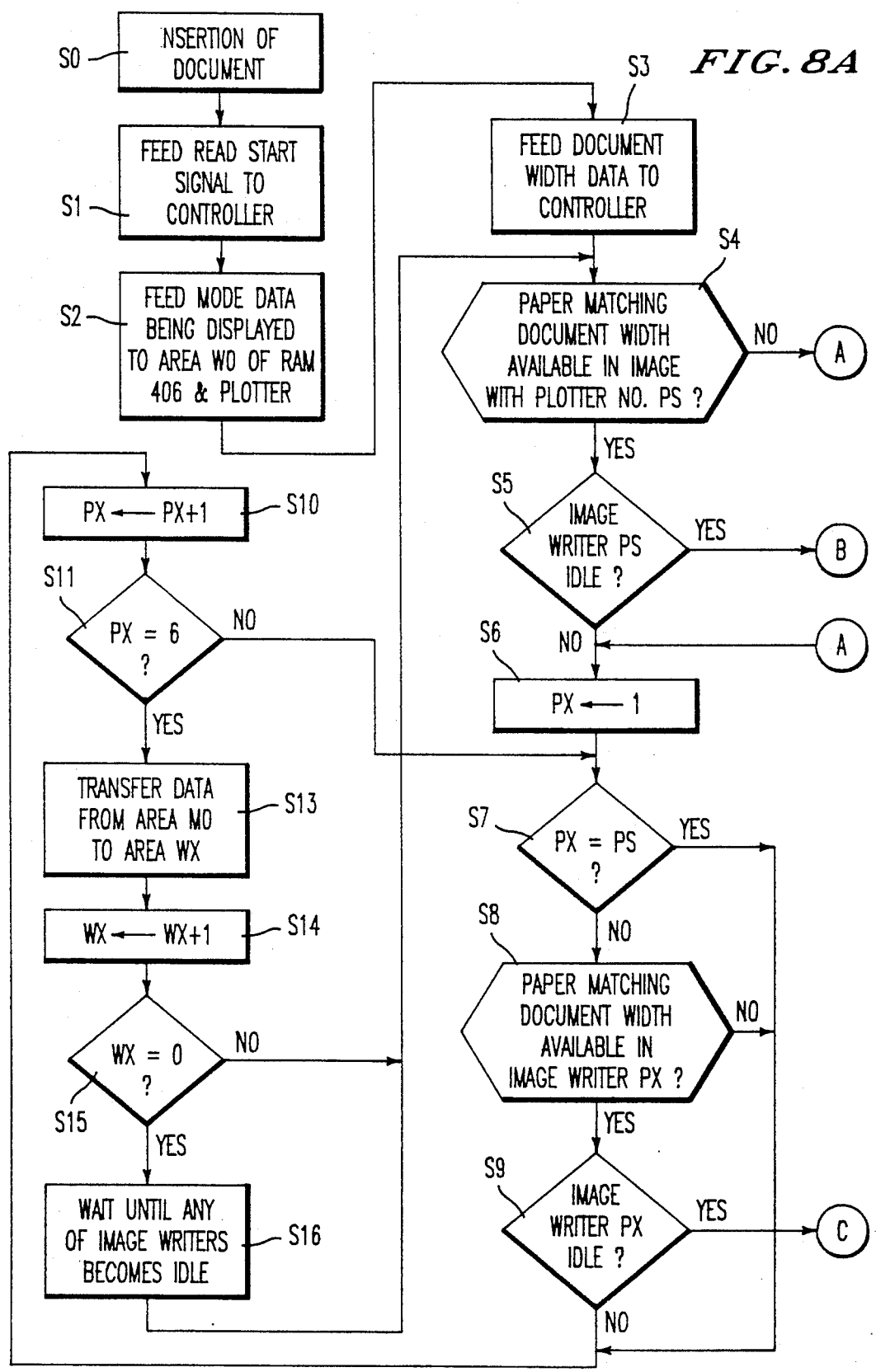
FIGS. 8A and 8B are flowcharts demonstrating, when combined as shown in FIG. 8, a specific control procedure which is executed by the controller.
Figure 8B:
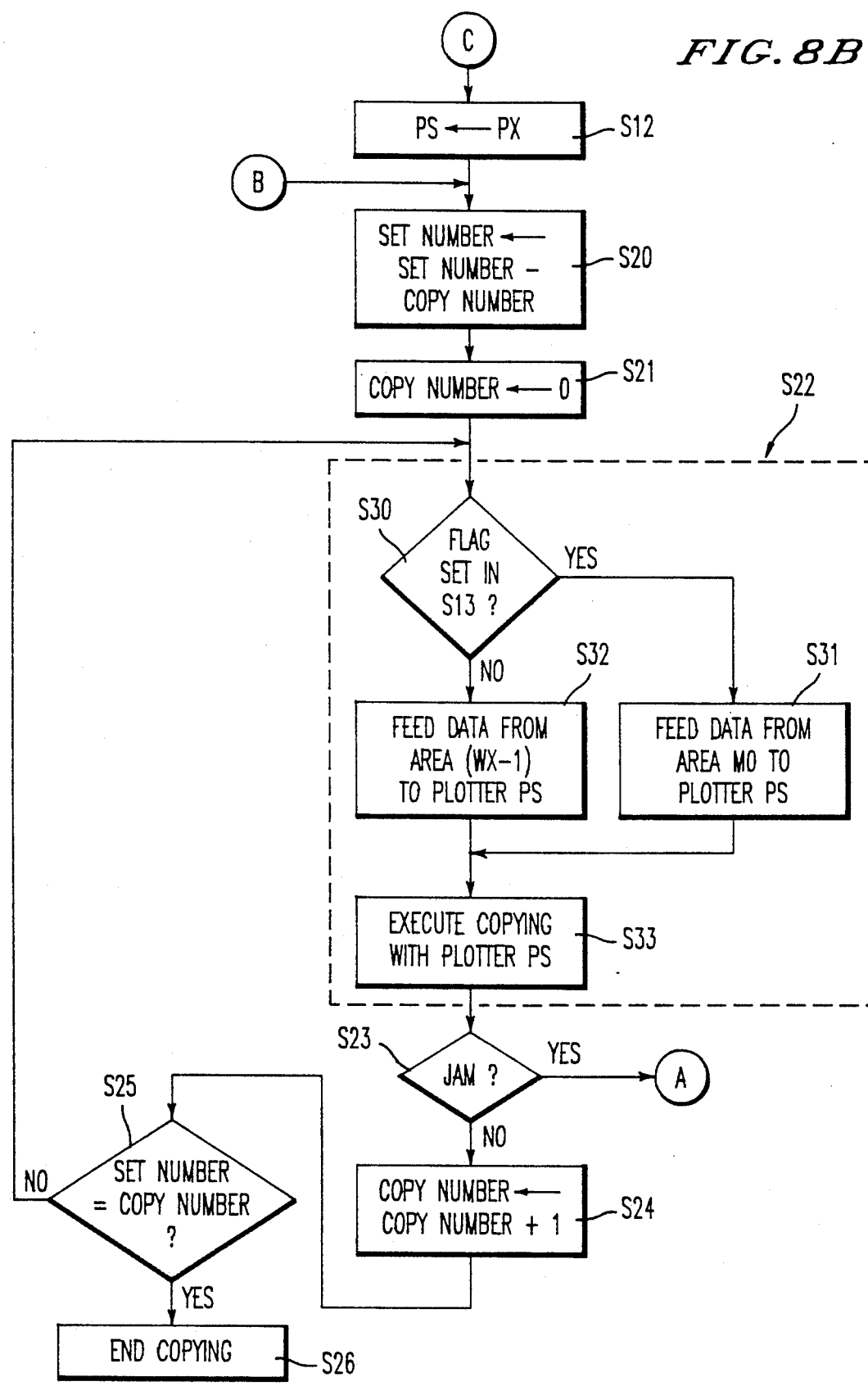

A specific control procedure of the digital copier having the above construction will be described with reference to FIGS. 8A and 8B.

The reader 10 begins its operation on the insertion of a document 60 in a document inlet which is formed in the image reader 10 (step S0). More specifically, the image reader 10 has a switch for sensing the insertion of a document and, when the switch is actuated by a document, starts reading the document. At the same time, the image reader 10 sends a read start signal to the controller 40. On receiving the read start signal (step S1), the controller 40 delivers mode data being displayed on the display section 504 to the area W0 of the RAM 406 (step S2). If the selected image writer is already copying, then the data sent from the controller 40 to the area W0 of the RAM 406 will be the data stored in associated one of the areas M1 to M5; if the mode clear key 518 has been pressed while the selected image writer is in operation or if the selected image writer is waiting, the data will be the data stored in the area M0. These data include a number assigned to the selected image writer, i.e., a plotter number PS. Among such data, the magnification change ratio, for example, is fed to the image writer also. The image reader 10 further includes a document sensor for sensing the length of the document 60 as measured in the main scanning direction, i.e. width. The length sensed by the document sensor is multiplied by the magnification change ratio, and the product is applied to the controller 40 (step S3).

On receiving the width data from the image reader 10, the controller 40 checks the image writer with the number PS to see if it is loaded with a paper matching the sensed document width in size (step S4). In this instance, the individual image writers have sent their paper size data to the controller 40 beforehand. If the image writer is loaded with such a paper, the controller 40 determines whether the image writer is waiting or not (step S5). If the image writer is not loaded with a paper of appropriate size, the controller 40 substitutes "1" for a variable PX (step S6) and sees if the resulting variable PX is identical with the plotter number PS of the selected image writer (step S7). If the selected image writer is waiting as determined by the step S5, the program advances to a step S20 which will be described. If the variable PX is not coincident with the plotter number PS as decided by the step S7, the controller 40 determines whether or not the image writer designated by the variable PX is loaded with a paper matching the document in size (step S8). If the answer of the step S8 is YES, the controller 40 determines whether or not the image writer of interest is waiting (step S9). If it is waiting, the controller 40 replaces the plotter number PS with the image writer designated by PX in order to execute copying operations with that image writer PX, and then advances to the step S20. If the image writer PX is not waiting, the controller 40 increments the variable PX by 1 (one) (step S10) and sees if the resulting variable PX is "6" (step S11). If the answer of the step S11 is NO, the program returns to the step S7; if it is YES, meaning that all the plotters P1 to P5 are not waiting at present, the controller 40 waits until any one of the image writers becomes idle. At this instant, the controller 40 transfers the data stored in the area M0 to an area WX or wait table (step S13) while setting a flag. This is to prevent the data stored in the current area M0 from being destroyed by data which may be written in the area M0 next. It is to be noted that the data stored in the area WX is the number of currently waiting image writers plus 1. In a step S14, the controller 40 increments the data in the area WX by 1 to see if it becomes "1" (step S15). If the answer of the step S15 is YES, meaning that the waiting table is also full, the controller 40 waits until any one of the image writers 30(1) to 30(5) becomes idle or ready (step S16).

When the image writer with the plotter number PS is waiting as decided in the step S5 or after PX has been substituted for the plotter number PS in the step S12, the controller 40 sets, as a set number, a number produced by subtracting the copy number from the initial set number (step S20). At this instant, while the copy number is usually zero, it is sometimes one or even greater than one such as when the copying operation is restarted after the removal of a paper jam. In the light of this, controller 40 sets a copy number "0" (step S21) and executes steps S22 to S25 to produce the set number of copies. In the step S22, the controller 40 determines whether or not the flag mentioned previously in relation to the step S13 has been set (step S30). If the answer of the step S30 is YES, the controller feeds the data from the area M0 to the image writer with the plotter number PS (step S31); if it is NO, the controller 40 feeds the data from an area WX-1 to the image writer of interest (S32). This allows the image writer with the plotter number PS to perform copying operations (step S33). Subsequently, the controller 40 sees if a jam has occurred (step S23) and, if the answer is YES, the program returns to the step S6 to repeat the previously stated procedure. If the answer of the step S23 is NO, the controller 40 increments the copy number by 1 (step S24) and, in the subsequent step S25, determines whether or not the copy number is equal to the set number. If the copy number is short of the set number, the controller 40 returns to the step S22; if the former is coincident with the latter, the controller 40 terminates the copying operation (step S26).

The store 20 is implemented as a page memory capable of accommodating five pages of data in the areas M1 to M5 and nine pages of data in the areas W1 to W9, i.e. fourteen pages at maximum. Image data representative of a document to be copied are fed from the store 20 to any of the image writers 30(1) to 30(5). In this instance, copy modes associated with the document are written in the area M0 or in the wait table and delivered therefrom to the image writer with the plotter number PS, table, as stated previously. In the step S33 for executing copying operations, if a jam or similar trouble has occurred, a trouble flag is set. The trouble flag is checked in a step S23 to see if such a trouble has occurred. If the answer of the step S23 is YES, the operation board 50 turns on a jam indicator and a jam position indicator to alert the operator to the trouble. While the operator removes a paper jamming the transport path of the image writer, the copying operations may be handed over to another image writer. This will prevent the copying operations from being interrupted due to the error settling time and thereby enhance efficient copying operations. In the illustrative embodiment, therefore, when a jam or similar error has occurred as determined by the step S23, the program immediately returns to the step S6 to cause another image writer loaded with a paper matching in size with the documents to continue the copying operations.

As described above, in the illustrative embodiment, when a designated image writer is already in operation, another writer can be selected. Further, when all the image writers are in operation, a document may be inserted to store image data thereof so as to cause a designated image writer to start on a copying operation automatically as soon as it becomes idle. This allows a plurality of image writers to operate at the same time without a plotter select key being pressed. In this instance, it is not necessary for the operator to be concerned about whether the image writers are busy or idle. Of course, since a store has a limited capacity an image reader is so constructed as to inhibit the insertion of a document when the store is full.

In summary, a digital copier of the present invention has unprecedented advantages as enumerated below.

(1) When a desired image writer is already operating, another image writer is designated by control means. Even when all the image writers are in operation, image data representative of a desired document are stored to cause a designated image writer to begin a copying operation automatically as soon as it becomes idle. Hence, a second document and successive documents can be reproduced without means which selects a particular image writer being manipulated.

(2) When a jam, serviceman call or similar error occurs in a designated image writer, the copying operations are handed over to another image writer to save the error settling time. This is especially effective when it comes to errors of the kind needing a serviceman call, i.e. long error settling time.

Various modifications will become possible for those skilled in the art after receiving the teachings of the present disclosure without departing from the scope thereof.

What is claimed is:

1. A digital copier comprising:
reading means for outputting image data representative of a document by reading said document;
storing means for storing the image data fed from said reading means;
a plurality of writing means each writing an image on a recording medium on the basis of the image data stored in said storing means, each of said plurality of writing means outputting status data representative of a writing condition under which said writing means is capable of performing a writing operation;
commanding means for producing a command representative of a desired writing condition;
selecting and designating means for selecting and designating any of said plurality of writing means;
display means for displaying said writing condition of said selected and designated writing means; and
control means for controlling said selecting and designating means, in response to the command from said commanding means and the status data from said plurality of writing means, to select and designate any of said plurality of writing means when said writing condition of said selected and designated writing means coincides with said desired writing condition.

2. A digital copier as claimed in claim 1, wherein said command comprises at least one of a desired number of copies, a magnification change ratio, and an image density.

3. A digital copier as claimed in claim 1, wherein said writing condition displayed by said display means comprises at least one of a set number of copies, a number of produced copies, trouble indications including a paper jam, a set image density, a set magnification ratio, a busy or writing status, and a ready or waiting status.

4. A digital copier as claimed in claim 1, wherein said command comprises at least one of a desired number of copiers, a magnification change ratio, and an image density, and wherein said writing condition displayed by said display means comprises at least one of a set number of copies, a number of produced copies, trouble indications including a paper jam, a set image density, a set magnification ratio, a busy or writing status, and a ready or waiting status.

5. A digital copier as claimed in claim 1, further comprising mode clear means for producing a mode clear signal, said control means comprising a memory for storing other status data, wherein said control means controls said display means, in response to said mode clear signal, to display said other status data with no regard to said status data outputted from said plurality of writing means.

6. A digital copier comprising:
reading means for outputting image data representative of a document by reading said document;
first storing means for storing the image data fed from said reading means;
a plurality of writing means, each writing an image on a recording medium on the basis of the image data stored in said storing means, each of said plurality of writing means outputting status data representative of a writing condition under which said writing means is capable of performing a writing operation;
commanding means for commanding said writing means to operate and generate operation data;
second storing means, each being associated with a respective one of said writing means and having a first area for storing said status data from said writing means and said operation data from said commanding means and a second area independent of said first area for storing said operation data from said commanding means;
display means for displaying said status data and said operation data; and
control means for storing, when said commanding means commands an operation, resulting operation data in said second area of said second storing means, comparing said operation data with each status data stored in said first area of said second storing means, selecting one of said writing means associated with the status data matching said operation data to cause said one writing means to operate, and writing said operation data in said first area associated with said writing means.

* * * * *